(12) United States Patent
Monda et al.

(10) Patent No.: US 10,341,253 B2
(45) Date of Patent: Jul. 2, 2019

(54) AUTOMATIC CONSOLIDATION OF NETWORK RESOURCES

(71) Applicant: Accenture Global Solutions Limited, Dublin (IE)

(72) Inventors: Vincenzo Monda, Nepi (IT); Gianluca D'Angelo, Rome (IT); Alessandro Orsano, Pomezia (IT); Angelo Mattei, Ronciglione (IT); Danilo Zaccariello, Rome (IT)

(73) Assignee: Accenture Global Solutions Limited, Dublin (IE)

( * ) Notice: Subject to any disclaimer, the term of this patent is extended or adjusted under 35 U.S.C. 154(b) by 362 days.

(21) Appl. No.: 15/269,504

(22) Filed: Sep. 19, 2016

(65) Prior Publication Data

US 2018/0083887 A1    Mar. 22, 2018

(51) Int. Cl.
*H04L 12/911* (2013.01)
*H04L 12/917* (2013.01)

(52) U.S. Cl.
CPC ............ *H04L 47/76* (2013.01); *H04L 47/829* (2013.01)

(58) Field of Classification Search
None
See application file for complete search history.

(56) References Cited

U.S. PATENT DOCUMENTS

| 7,068,668 | B2 | 6/2006 | Feuer |
| 8,107,593 | B2 | 1/2012 | Brugman et al. |
| 8,666,027 | B2 | 3/2014 | Eder |
| 8,780,933 | B2 | 7/2014 | Schmitz et al. |
| 2004/0034577 | A1* | 2/2004 | Van Hoose ......... G06Q 10/087 705/28 |
| 2010/0135280 | A1 | 6/2010 | Ikegami et al. |
| 2012/0151040 | A1* | 6/2012 | Mouravyov ........ H04L 41/0856 709/224 |

FOREIGN PATENT DOCUMENTS

CN    100382544 C    4/2008

OTHER PUBLICATIONS

Dornheim, "Managing the PSTN Transformation," http://www.ittoday.info/Excerpts/PSTN_Transformation.pdf, Feb. 26, 2015, 46 pages.
Nokia, "PSTN Smart Transform," http://networks.nokia.com/in/portfolio/solutions/pstn-smart-transform, May 28, 2015, 5 pages.

(Continued)

*Primary Examiner* — Scott B Christensen
(74) *Attorney, Agent, or Firm* — Harrity & Harrity, LLP

(57) ABSTRACT

A device may receive data associated with network resources. The data may be received from another device and from a system. The data may include an attribute of the network resources. The device may process the data to align the data received from the other device and from the system. The device may determine a manner in which the network resources are to be consolidated based on the attribute of the network resources. The device may perform an action based on determining the manner in which the network resources are to be consolidated. The action may be associated with consolidating the network resources.

20 Claims, 7 Drawing Sheets

(56) References Cited

OTHER PUBLICATIONS

Joseph, "PSTN Services Migration to IMS: Are SPs finally reaching the tipping point for large scale migrations?," http://www3.alcatel-lucent.com/belllabs/advisory-services/documents/jp_paper.pdf, Sep. 27, 2010, 6 pages.
ShoreTel, "City of Subiaco Delivers on Core Customer Service Strategy with ShoreTel," http://media.shoretel.com/documents/Subiaco_SuccessStory_v2.pdf, Apr. 24, 2012, 3 pages.
Bluetone Communications, "POTS Consolidation," http://bluetone.net/services/pots-consolidation/, Jun. 29, 2013, 1 page.
Cisco, "NGN for PSTN Transformation," https://www.cisco.com/web/partners/pr67/pr36/docs/NPT_Cisco_Italtel_technical_flyer_May09.pdf, Apr. 27, 2005, 6 pages.
Sheng-Wang Yu et al, "Transformation of PSTN to Next Generation Network," http://ieeexplore.ieee.org/xpl/login.jsp?tp=&arnumber=6665272, Sep. 25, 2013, 3 pages.
Xu Huangcheng, "A proper startup for network transformation," http://www.huawei.com/ilink/en/download/HW_079511, Nov. 21, 2005, 5 pages.
Nokia, "Turn your legacy PSTN into a competitive advantage," https://resources.alcatel-lucent.com/asset/180329, May 2015, 8 pages.

\* cited by examiner

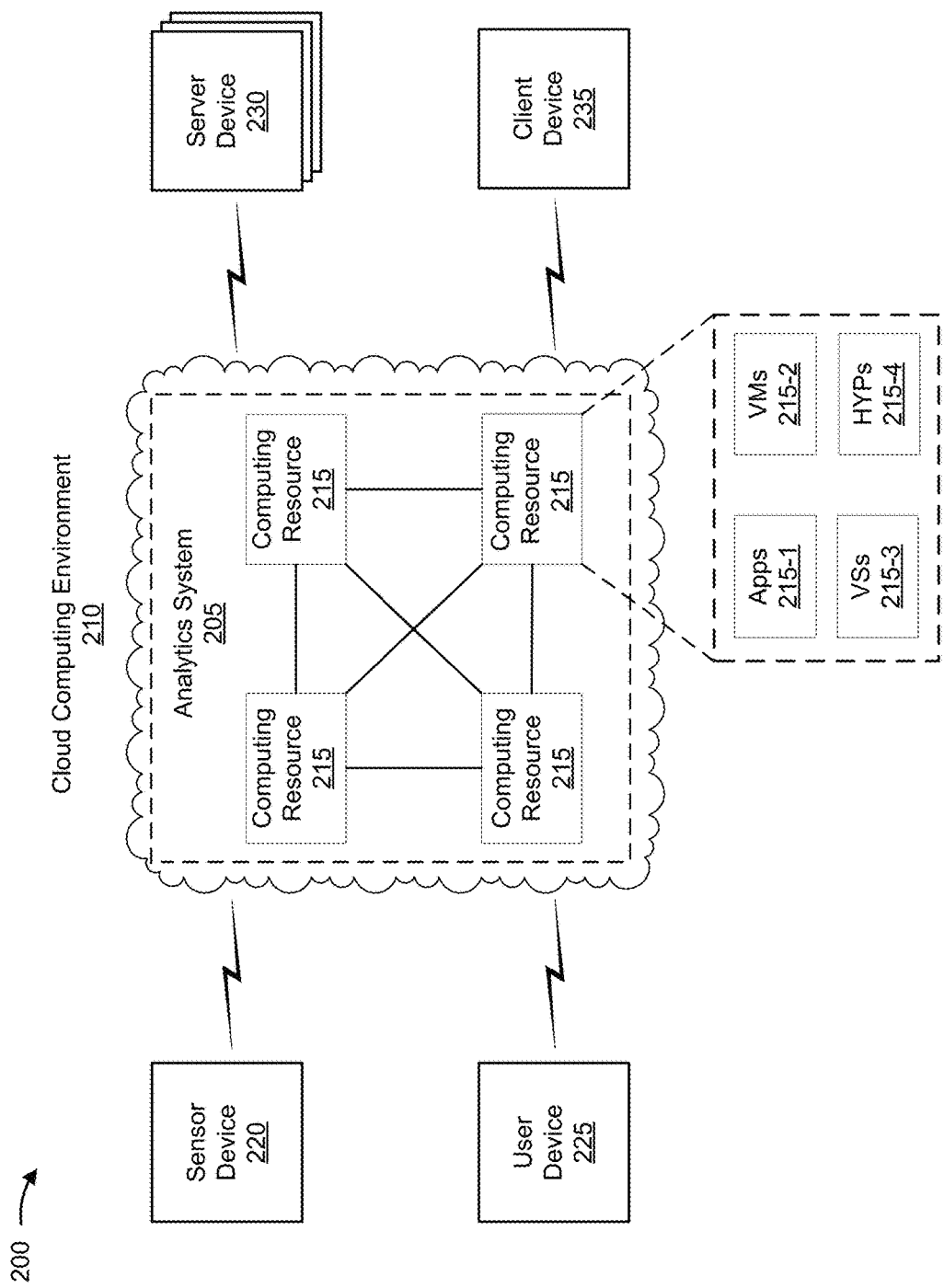

AUTOMATIC CONSOLIDATION OF NETWORK RESOURCES

BACKGROUND

Data centers may include a variety of computer systems and associated components, such as telecommunications and storage systems. Data centers generally include redundant or backup power supplies, redundant data communications connections, environmental controls (e.g., air conditioning, fire suppression) and/or various security devices. Large data centers may provide industrial scale operations.

A data center may house computing and electrical equipment in equipment racks (e.g., rack-mountable servers, power supplies, network equipment, data storage equipment, ventilation equipment, cable management systems, etc.). Such racks may be of various sizes and may be measured in a standard unit, such as rack units (RUs). Equipment racks include a frame with mounting infrastructure via which equipment can be securely mounted. Equipment racks are typically used for space-efficient storage and housing of data and computing equipment. For example, a typical equipment rack may be used to house as many as forty or more servers in a relatively small space. In a telephone exchange, equipment racks may house telecommunications equipment, circuits, circuit panels, wires, etc. Equipment racks may also include features to improve ventilation and equipment cooling, as well as seismic tie downs for secure mounting to building foundation and flooring.

SUMMARY

According to some possible implementations, a device may include one or more processors to receive data associated with network resources. The data may be received from another device and from a system. The data may include an attribute of the network resources. The one or more processors may process the data to align the data received from the other device and from the system. The one or more processors may determine a manner in which the network resources are to be consolidated based on the attribute of the network resources. The one or more processors may perform an action based on determining the manner in which the network resources are to be consolidated. The action may be associated with consolidating the network resources.

According to some possible implementations, a computer-readable medium may store instructions that, when executed by one or more processors, cause the one or more processors to receive data associated with one or more network resources. First data of the data may be associated with the one or more network resources physically located in a center. Second data of the data may be associated with an electronic record of the one or more network resources. The one or more instructions may cause the one or more processors to process the data based on receiving the data associated with the one or more network resources. The one or more instructions may cause the one or more processors to determine one or more action items associated with consolidating the one or more network resources in the center based on the first data or the second data. The one or more instructions may cause the one or more processors to perform one or more actions based on determining the one or more action items.

According to some possible implementations, a method may include receiving, by a first device, data associated with network resources that are to be consolidated. The data may be received from a second device used to gather the data from a center. The data may be received from a third device that stores an electronic record of the network resources. The method may include processing, by the first device, the data based on receiving the data. The method may include determining, by the first device, a manner in which to consolidate the network resources in the center based on an attribute of the network resources. The attribute may be included in the data. The manner in which to consolidate the network resources may be associated with physically moving the network resources in the center. The method may include performing, by the first device, an action associated with physically moving the network resources in the center based on determining the manner in which to consolidate the network resources.

BRIEF DESCRIPTION OF THE DRAWINGS

FIG. 2 is a diagram of an example environment in which systems and/or methods, described herein, may be implemented;

DETAILED DESCRIPTION

The following detailed description of example implementations refers to the accompanying drawings. The same reference numbers in different drawings may identify the same or similar elements.

In a center (e.g., a wire center, a data center, a data storage center, a telephone exchange, or the like), network resources may be decommissioned, added, migrated, upgraded, etc. When decommissioning, for example, a public switched telephone network (PSTN) telephone exchange, a network administrator may wish to physically consolidate telephone exchange network resources (e.g., prior to migrating/upgrading the network resources from a PSTN infrastructure to an internet protocol (IP) infrastructure). For example, network resources may need to be physically consolidated (e.g., relocated to a common rack or location) as part of streamlining a migration, upgrade, and/or decommissioning effort. As another example, network resources may need to be physically consolidated to maximize a quantity of idle and/or ready-for-shutdown centers.

Determining a manner in which to consolidate the network resources may be time consuming and/or resource intensive (e.g., due to fragmented or inconsistent data related to the existing network resources of the center and/or difficulties related to collecting the data). For example, documentation may indicate that the PSTN telephone exchange includes a certain quantity and configuration of network resources, but in reality, the actual quantity and configuration of network resources may differ from what is documented. Moreover, physically consolidating network resources can be time consuming, effort intensive, and costly.

Implementations, described herein, may automatically collect data associated with network resources of a center, determine a manner in which the network resources are to be consolidated (e.g., prior to migration of the network resources), and physically consolidate the network resources. More specifically, information regarding the configuration, location, and/or topology of installed network resources may be determined using sensor and/or imaging technology. Further, attributes of network resources may be determined, and network resources of particular types or having particular attributes may be consolidated (e.g., into a single group of racks, into a single room, or the like).

Figure 1A:
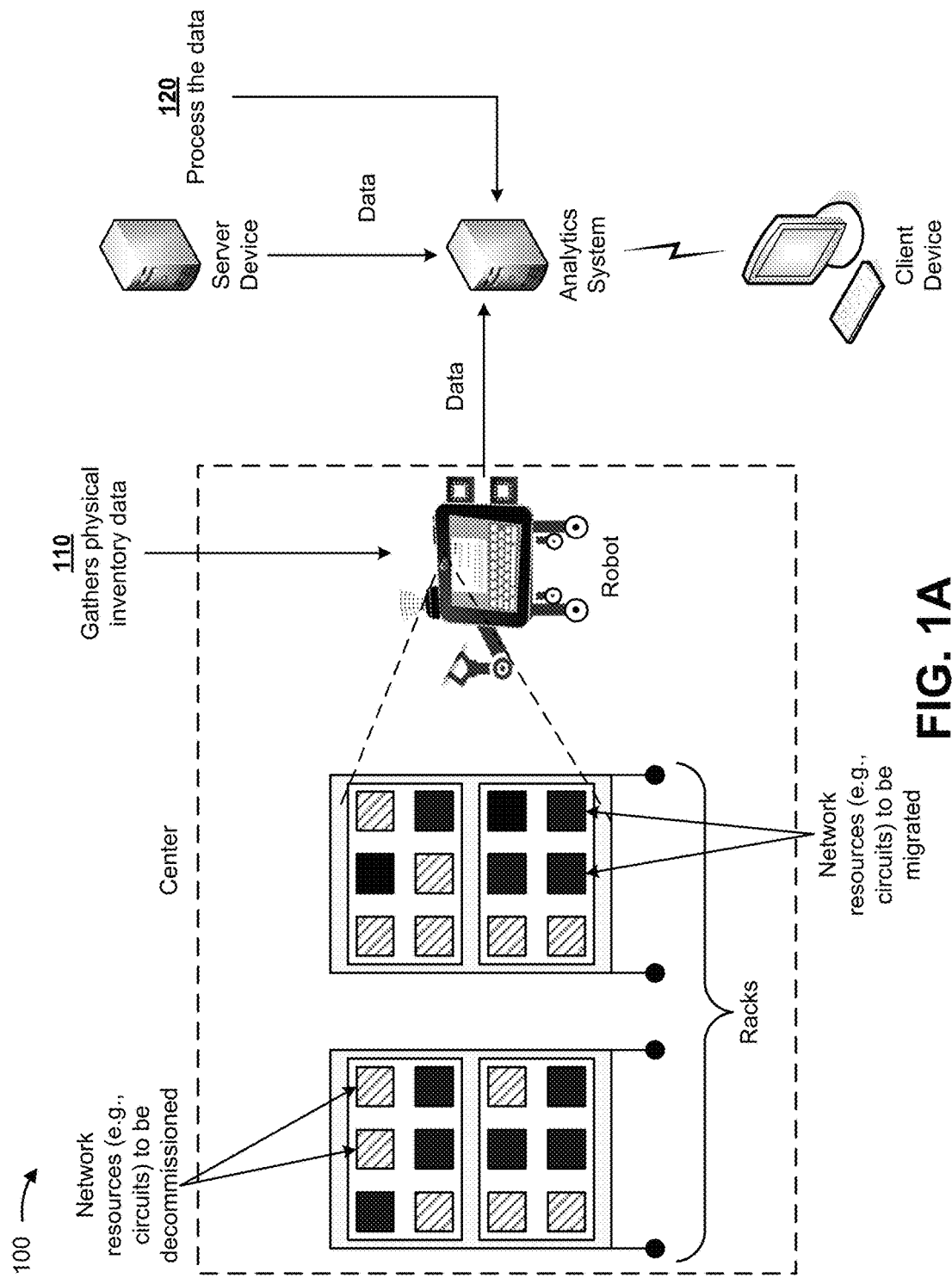
FIGS. 1A-1C are diagrams of an overview of an example implementation described herein.
Figure 1B:
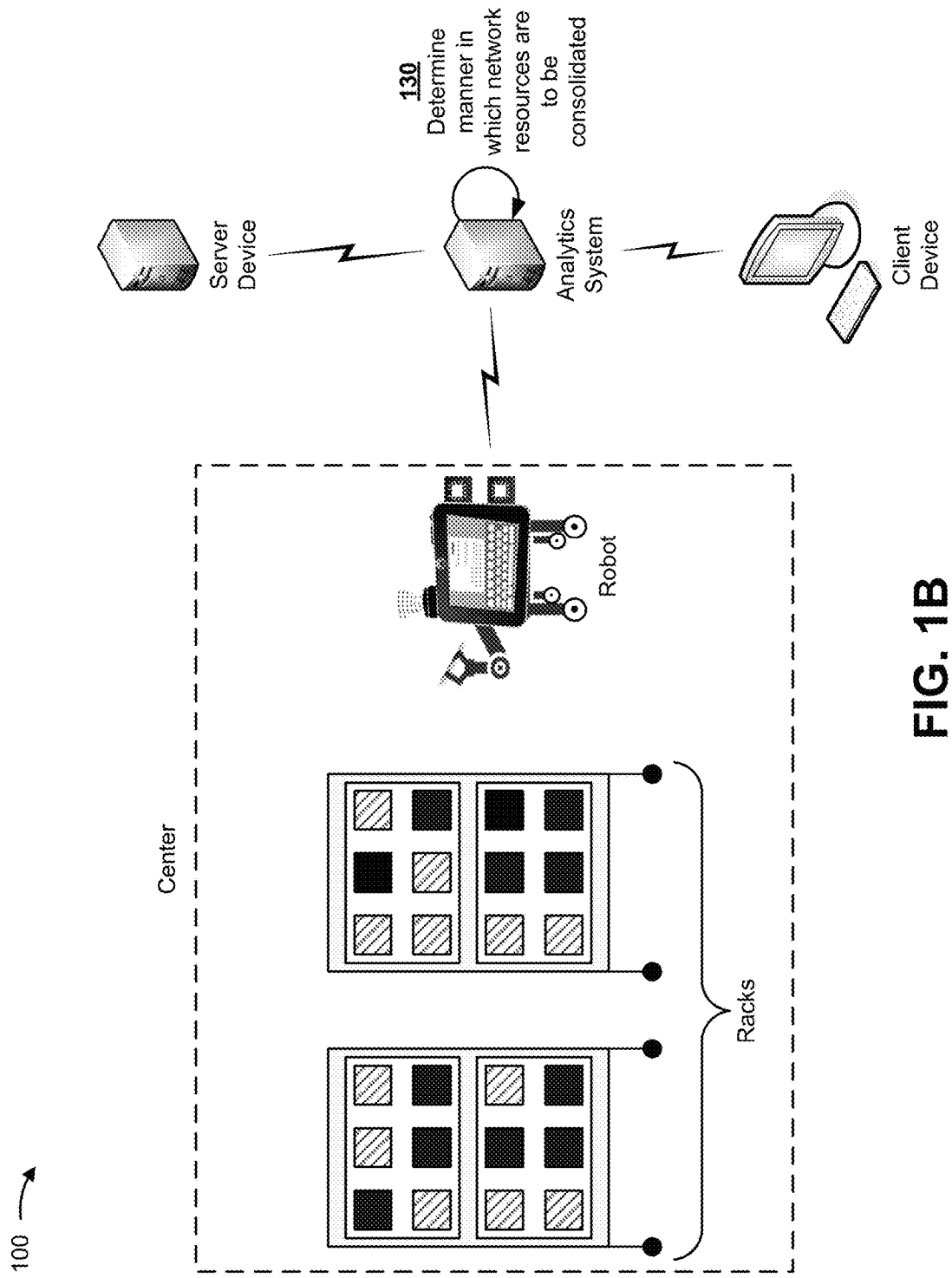
Figure 1C:
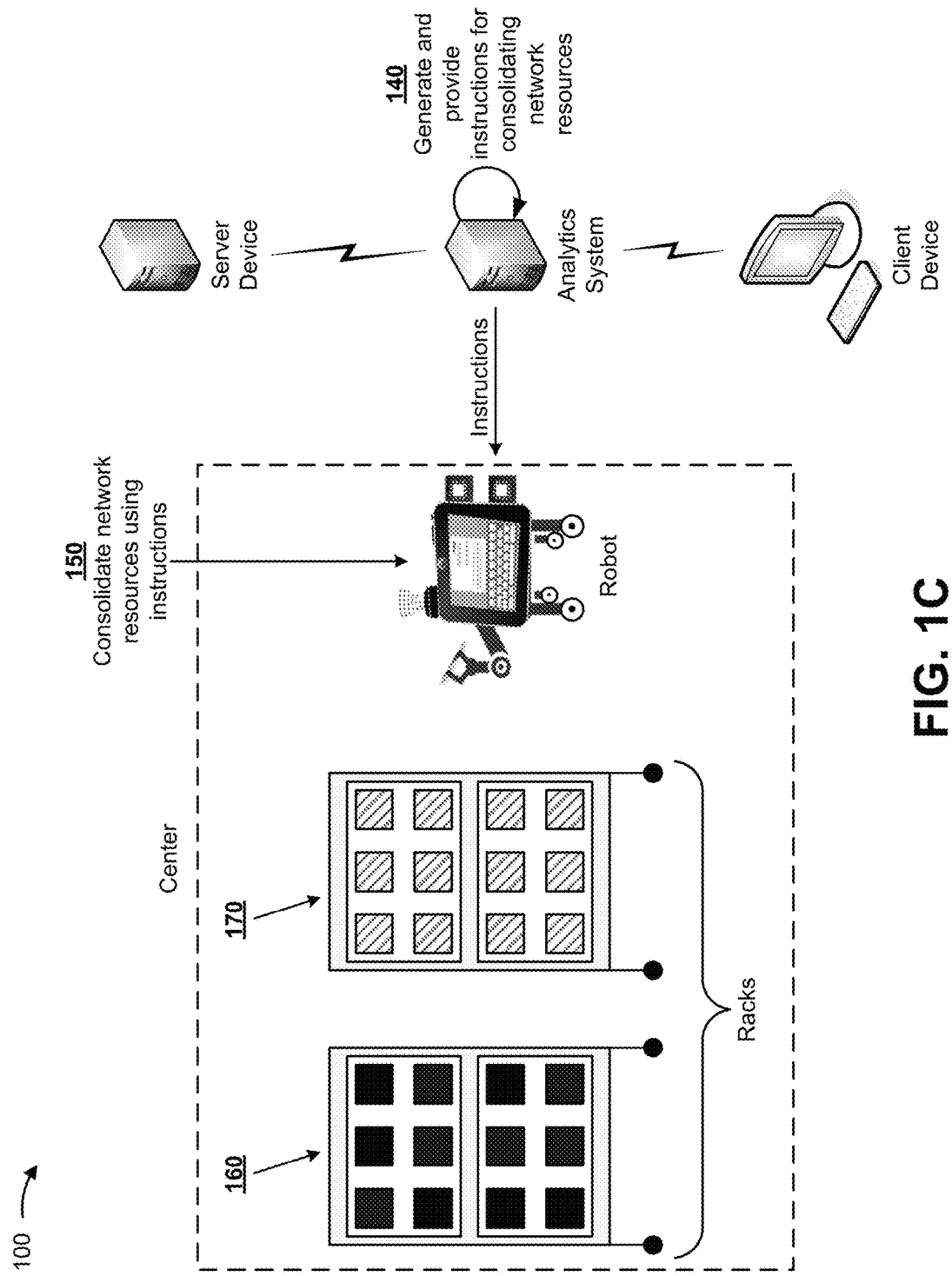

FIGS. 1A-1C are diagrams of an overview of an example implementation 100 described herein. As shown in FIG. 1A, and by reference number 110, a robot may gather physical inventory data. For example, the robot may gather physical inventory data identifying network resources (e.g., circuits, wires, computing equipment, racks, network devices, etc.) in a center, such as a telephone exchange, a wire center, or a data center, that are to be migrated and/or decommissioned. In some implementations, the robot may gather the physical inventory data using a camera or a reader device to gather data related to the network resources in the center. Additionally, or alternatively, the robot may gather configuration data (e.g., data related to a configuration of a network resource, a user service associated with a network resource, etc.). In some implementations, the robot may gather the configuration data from a server device connected to the center, such as a server device that downloads configuration data from a network resource in the center, and/or using a system/software, such as an on-board system/software connected to a network resource in the center.

An analytics system may receive the data about the physical network resources from the robot as well as data from a server device. The data received from the server device may include data stored by a network provider about the network resources of the center (e.g., electronic records of the network resources in the center). For example, the data regarding the network resources from the server device may identify network topology, physical locations of network resources, attributes of each network resource at each position in a rack, or the like. As shown by reference number 120, the analytics system may process the data from the robot and the server device (e.g., removing duplicate data, identifying any inconsistencies between the data, etc.).

In some implementations, a set of network resources, such as circuits, cables, network devices, or racks, having a set of attributes may be defined as network resources to be decommissioned (e.g., circuits to be decommissioned during a migration of network resources by a network administrator), while another set of network resources with a different set of attributes may be defined as network resources to be migrated (e.g., circuits to remain operational after the migration effort). The network resources to be decommissioned and the network resources to be migrated may be identified based on their attributes as determined by the data regarding the network resources. When processing the data from the robot and/or the server device, the analytics system may identify the network resources to be migrated and the network resources to be decommissioned. Time and effort used to determine network resources to consolidate may be reduced.

Referring to FIG. 1B, and as shown by reference number 130, the analytics system may determine a manner in which network resources on racks in the center are to be consolidated (e.g., moved from one rack to another) based on information identifying which network resources are to be migrated and/or decommissioned and/or information associated with an attribute of the network resources. For example, the analytics system may determine the manner based on data received from the server device and/or the robot about which circuits and/or wires are to be decommissioned, information identifying a length of usage of the circuits and/or wires, a size of the circuits and/or wires, etc.

Referring to FIG. 1C, and as shown by reference number 140, the analytics system may generate instructions for consolidating the network resources and may provide the instructions to the robot. For example, the analytics system may generate instructions indicating that circuits and/or wires to be migrated are to be consolidated on a first rack and that circuits and/or wires to be decommissioned are to be consolidated on a second rack. As shown by reference number 150, the robot may then consolidate the network resources using the instructions. In some implementations, the analytics system may provide the instructions to a user device of a worker, such as to enable manual consolidation of the network resources by the worker (e.g., rather than, or in addition to, providing the instructions to the robot for consolidation by the robot). As shown by reference number 160, network resources to remain operational (e.g., that are to be migrated) may be consolidated to a single rack. Additionally, as shown by reference number 170, network resources to be decommissioned may be consolidated to a single rack.

In this way, an analytics system may automatically receive data associated with network resources in a center, determine a manner in which the network resources are to be consolidated (e.g., prior to being migrated and/or decommissioned), and consolidate the network resources. This enables the analytics system to quickly and efficiently determine a manner in which to consolidate the network resources, thereby conserving processing resources. In addition, migrating and/or decommissioning efforts may be streamlined and/or made more efficient, thereby conserving resources.

As indicated above, FIGS. 1A-1C are provided merely as an example. Other examples are possible and may differ from what was described with regard to FIGS. 1A-1C. For example, implementations described with respect to FIGS. 1A-1C may be applicable to any type of center, such as a telephone exchange, a wire center, or the like.

FIG. 2 is a diagram of an example environment 200 in which systems and/or methods, described herein, may be implemented. As shown in FIG. 2, environment 200 may include an analytics system 205, a cloud computing environment 210, a set of computing resources 215, a sensor device 220, a user device 225, one or more server devices 230 (referred to collectively as "server devices 230," and individually as "server device 230"), and a client device 235. Devices of environment 200 may interconnect via wired connections, wireless connections, or a combination of wired and wireless connections.

Analytics system 205 includes one or more devices capable of receiving information associated with network resources of a center, processing the information to determine a manner in which the network resources are to be consolidated, and providing instructions for consolidating the network resources, as described elsewhere herein. For example, analytics system 205 may include a cloud server or a group of cloud servers. In some implementations, analytics system 205 may be designed to be modular such that certain software components can be swapped in or out depending on a particular need. As such, analytics system 205 may be easily and/or quickly reconfigured for different uses.

In some implementations, as shown, analytics system 205 may be hosted in a cloud computing environment 210. Notably, while implementations described herein describe analytics system 205 as being hosted in cloud computing environment 210, in some implementations, analytics system 205 may not be cloud-based (i.e., may be implemented outside of a cloud computing environment) or may be partially cloud-based.

Cloud computing environment 210 includes an environment that hosts analytics system 205. Cloud computing environment 210 may provide computation, software, data access, storage, etc. services that do not require end-user knowledge of a physical location and configuration of system(s) and/or device(s) that host analytics system 205. As shown, cloud computing environment 210 may include a group of computing resources 215 (referred to collectively as "computing resources 215" and individually as "computing resource 215").

Computing resource 215 includes one or more personal computers, workstation computers, server devices, or other types of computation and/or communication devices. In some implementations, computing resource 215 may host analytics system 205. The cloud resources may include compute instances executing in computing resource 215, storage devices provided in computing resource 215, data transfer devices provided by computing resource 215, etc. In some implementations, computing resource 215 may communicate with other computing resources 215 via wired connections, wireless connections, or a combination of wired and wireless connections.

As further shown in FIG. 2, computing resource 215 may include a group of cloud resources, such as one or more applications ("APPs") 215-1, one or more virtual machines ("VMs") 215-2, one or more virtualized storages ("VSs") 215-3, or one or more hypervisors ("HYPs") 215-4.

Application 215-1 includes one or more software applications that may be provided to or accessed by one or more devices of environment 200. Application 215-1 may eliminate a need to install and execute the software applications on devices of environment 200. For example, application 215-1 may include software associated with analytics system 205 and/or any other software capable of being provided via cloud computing environment 210. In some implementations, one application 215-1 may send/receive information to/from one or more other applications 215-1, via virtual machine 215-2.

Virtual machine 215-2 includes a software implementation of a machine (e.g., a computer) that executes programs like a physical machine. Virtual machine 215-2 may be either a system virtual machine or a process virtual machine, depending upon use and degree of correspondence to any real machine by virtual machine 215-2. A system virtual machine may provide a complete system platform that supports execution of a complete operating system ("OS"). A process virtual machine may execute a single program, and may support a single process. In some implementations, virtual machine 215-2 may execute on behalf of a user (e.g., client device 235), and may manage infrastructure of cloud computing environment 210, such as data management, synchronization, or long-duration data transfers.

Virtualized storage 215-3 includes one or more storage systems and/or one or more devices that use virtualization techniques within the storage systems or devices of computing resource 215. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 215-4 may provide hardware virtualization techniques that allow multiple operating systems (e.g., "guest operating systems") to execute concurrently on a host computer, such as computing resource 215. Hypervisor 215-4 may present a virtual operating platform to the guest operating systems, and may manage the execution of the guest operating systems. Multiple instances of a variety of operating systems may share virtualized hardware resources.

Sensor device 220 includes one or more devices for obtaining sensor-related information. For example, sensor device 220 may include a camera (e.g., a visual spectrum imaging camera, an infrared or near infrared imaging camera, a multispectral imaging camera, a hyperspectral imaging camera, a thermal imaging camera, a laser mapping imagery camera, etc.), a reader device (e.g., a radio-frequency identification (RFID) reader, a barcode reader, or a Quick response (QR) code reader) to read an RFID tag, a barcode tag, or a QR code tag, or a similar type of device, such as a device that may aid in gathering information related to network resources in a center. In some implementations, sensor device 220 may be attached to a robot, an unmanned aerial vehicle (UAV), user device 225, or a similar type of device/vehicle. In some implementations, sensor device 220 may gather information associated with network resources in a center, such as a type, a quantity, or a dimension of network resources in the center, as described elsewhere herein. Additionally, or alternatively, sensor device 220 may provide the information to analytics system 205, as described elsewhere herein.

User device 225 includes one or more devices capable of receiving, providing, storing, generating, and/or processing information associated with network resources in a center. For example, user device 225 may include a communication and/or computing device, such as a mobile phone (e.g., a smart phone or a radiotelephone), a laptop computer, a tablet computer, a gaming device, a wearable communication device (e.g., a smart wristwatch, a pair of smart eyeglasses, or an activity band), a robot, a UAV, or a similar type of device. In some implementations, user device 225 may provide information associated with network resources in a center (e.g., information gathered using sensor device 220), as described elsewhere herein. Additionally, or alternatively, user device 225 may receive information and/or instructions associated with consolidation of the network resources in the center (e.g., from analytics system 205), as described elsewhere herein.

Server device 230 includes one or more devices capable of receiving, providing, storing, generating, and/or processing information associated with network resources in a center. For example, server device 230 may include a server (e.g., in a data center or a cloud computing environment), a data center (e.g., a multi-server micro data center), a workstation computer, a virtual machine (VM) provided in a cloud computing environment, or a similar type of device. In some implementations, server device 230 may receive a request (e.g., a query) for information associated with network resources in a center (e.g., from analytics system 205), as described elsewhere herein. Additionally, or alternatively, server device 230 may provide the information to analytics system 205 (e.g., based on the request from analytics system 205), as described elsewhere herein.

Client device 235 includes one or more devices capable of receiving, providing, storing, generating, and/or processing information associated with network resources in a center. For example, client device 235 may include a communication and/or computing device, such as a desktop computer, a laptop computer, a tablet computer, a server device, a mobile phone (e.g., a smart phone or a radiotelephone), a wearable communication device (e.g., a smart wristwatch, an activity band, or a pair of smart eyeglasses), a gaming device, or a similar type of device. In some implementations, client device 235 may receive a result of an analysis by analytics system 205, as described elsewhere herein. Additionally, or alternatively, client device 235 may provide the result for display (e.g., via a display of client device 235), as described elsewhere herein.

The number and arrangement of devices and networks shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
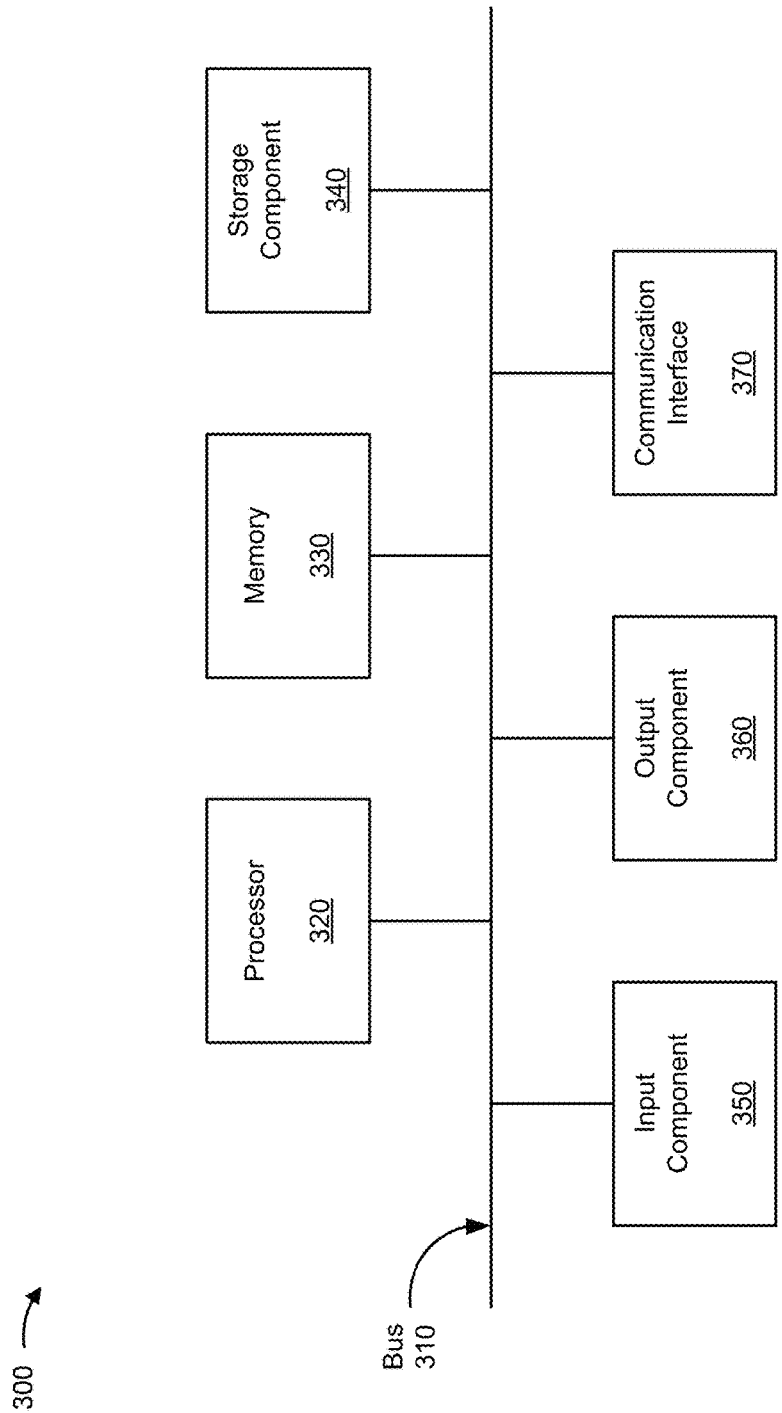
FIG. 3 is a diagram of example components of one or more devices of FIG. 2.

FIG. 3 is a diagram of example components of a device 300. Device 300 may correspond to analytics system 205, cloud computing environment 210, a set of computing resources 215, sensor device 220, user device 225, server device 230, and client device 235. In some implementations, analytics system 205, cloud computing environment 210, a set of computing resources 215, sensor device 220, user device 225, server device 230, and client device 235 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
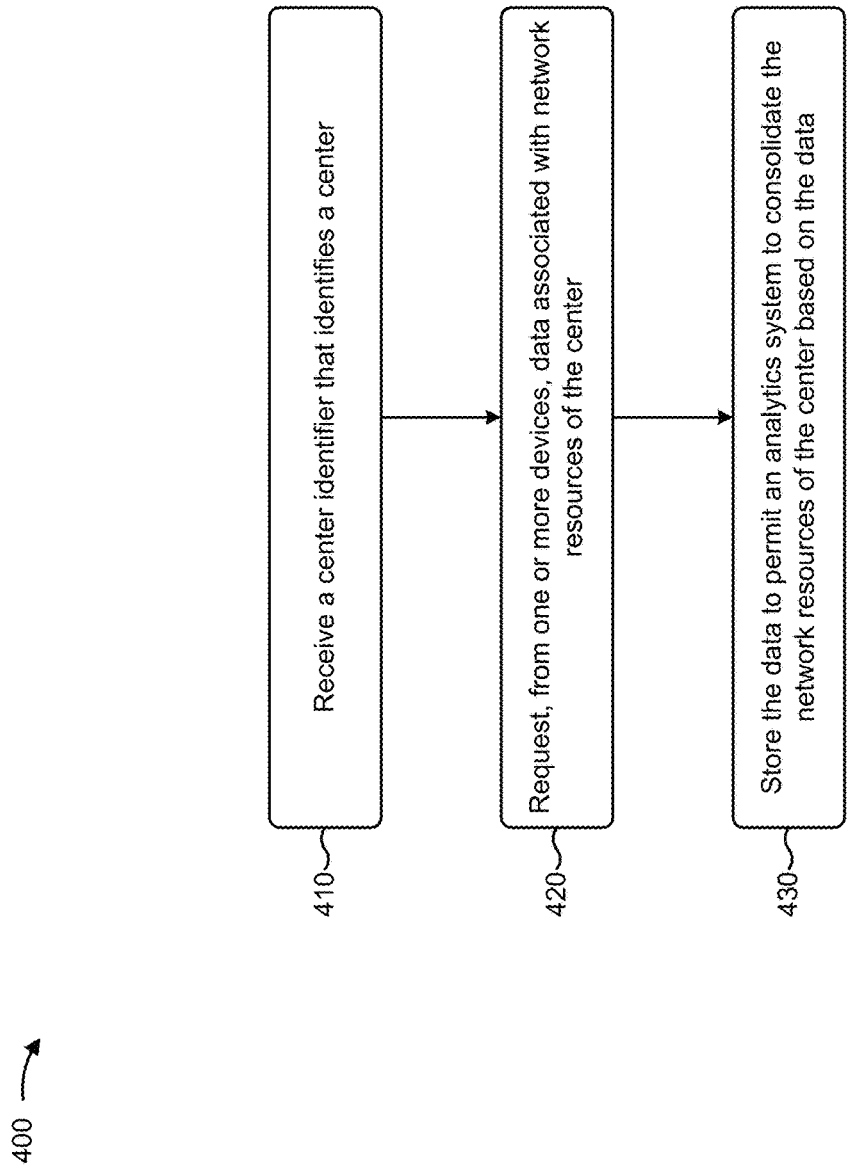
FIG. 4 is a flow chart of an example process for automatic gathering of data related to network resources.

FIG. 4 is a flow chart of an example process 400 for automatic gathering of data related to network resources. In some implementations, one or more process blocks of FIG. 4 may be performed by analytics system 205. In some implementations, one or more process blocks of FIG. 4 may be performed by another device or a group of devices separate from or including analytics system 205, such as cloud computing environment 210, a set of computing resources 215, sensor device 220, user device 225, server device 230, and client device 235.

As shown in FIG. 4, process 400 may include receiving a center identifier that identifies a center (block 410). For example, analytics system 205 may receive a center identifier, such as an IP address, that identifies a center to be decommissioned. As described herein, a center identifier may identify a center, such as a telephone exchange, a wire center, a data center, or the like.

In some implementations, analytics system 205 may receive the center identifier from client device 235 and/or server device 230. In some implementations, analytics system 205 may receive the center identifier based on a user of client device 235 identifying a center to be decommissioned, based on a decommissioning schedule, or based on requesting the center identifier. For example, when requesting the center identifier, analytics system 205 may request the center identifier based on other information associated with the center, such as information indicating that a threshold quantity of years the center has been active or a threshold quantity of years network resources in the center have been in use is satisfied, based on the center identifier relative to other center identifiers in a data structure (e.g., request the highest numerical value identifier first, lowest numerical value identifier first, request in alphabetical or reverse alphabetical order, etc.).

As further shown in FIG. 4, process 400 may include requesting, from one or more devices, data associated with network resources of the center (block 420). For example, analytics system 205 may request (e.g., query) the data associated with the network resources of the center (e.g., using the center identifier). In some implementations, analytics system 205 may request the data from server device 230. Additionally, or alternatively analytics system 205 may request the data from sensor device 220 and/or user device 225.

In some implementations, analytics system 205 may request data that includes information identifying a physical layout of the center, a quantity and/or type of a rack (e.g., an equipment rack) in the center, a network resource identifier that identifies network resources in the center, such as a circuit identifier, a wire identifier, a network device identifier, a PSTN telephone number associated with a network resource, etc. Additionally, or alternatively, the requested information may further include information identifying a type of the network resource, such as a circuit type or a network device type (e.g., router, switch, or server), a status of a network resource in the center, such as active/inactive or available/busy, a type of a service provided via the center, such as a PSTN service or a data storage service, or the like.

In some implementations, when requesting the data, analytics system 205 transmit a command or a message (e.g., to gather the data). For example, analytics system 205 may transmit a command or a message to sensor device 220 to gather the data (e.g., data related to network resources physically in the center). As another example, analytics system 205 may transmit a message to a network administrator to gather the data (e.g., using user device 225 that is equipped with an attached sensor device 220). As another example, analytics system 205 may transmit a command to user device 225 to gather the data (e.g., using sensor device 220). Continuing with the previous example, a robot and/or a UAV may use sensor device 220 to capture an image of a network resource in the center and/or read a barcode, RFID, or QR code attached to the network resource to gather the data.

If analytics system 205 receives an image, such as an image captured by user device 225, analytics system 205 may process the image using machine learning, pattern recognition, image processing, etc. to identify a network resource in the image. For example, analytics system 205 may process the image to detect an object, an edge, a feature, or the like shown in the image to identify a network resource shown in the image. As another example, analytics system 205 may use a structuring element to identify a network resource shown in the image and/or may compare the received image to a set of training images to identify the network resource shown in the image. This conserves processing resources by enabling analytics system 205 to quickly and accurately identify a network resource in the center.

In some implementations, analytics system 205 may request data associated with network resources of the center from server device 230. For example, analytics system 205 may query electronic records of the network resources in the center. In some implementations, when requesting data from server device 230, analytics system 205 may request the data from one or more systems, platforms, and/or databases. For example, analytics system 205 may request the data from a network inventory management system, an operations support system, a business support system, a customer relationship management system, or the like.

As further shown in FIG. 4, process 400 may include storing the data to permit an analytics system to consolidate the network resources of the center based on the data (block 430). For example, analytics system 205 may store the data to permit analytics system 205 to consolidate the network resources of the center based on the data. In some implementations, analytics system 205 may store the data using memory resources of a storage device, a data structure, a database, or the like.

In some implementations, when storing the data, analytics system 205 may merge data from multiple sources (e.g., multiple sensor devices 220, multiple user devices 225, multiple server devices 230, multiple systems, or multiple platforms). For example, analytics system 205 may de-duplicate the data, apply similar formatting to data from different sources, remove corrupted data, perform a match-merge, perform a one-to-one merge, append one data set to another, etc. This improves the data for use by analytics system 205, thereby conserving processing resources of analytics system 205 when analytics system 205 uses the data.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
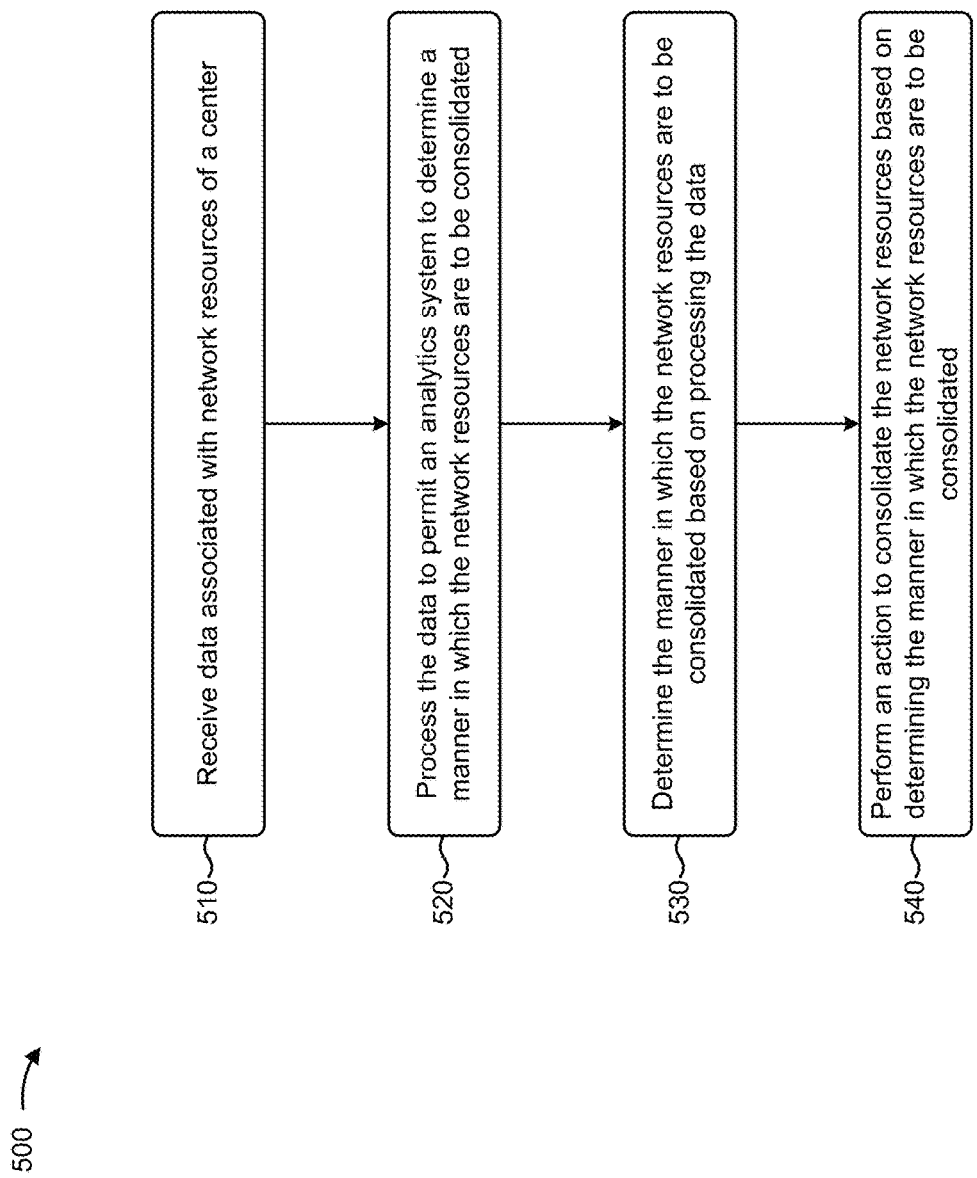
FIG. 5 is a flow chart of an example process for automatic consolidation of network resources.

FIG. 5 is a flow chart of an example process 500 for automatic consolidation of network resources. In some implementations, one or more process blocks of FIG. 5 may be performed by analytics system 205. In some implementations, one or more process blocks of FIG. 5 may be performed by another device or a group of devices separate from or including analytics system 205, such as cloud computing environment 210, a set of computing resources 215, sensor device 220, user device 225, server device 230, and client device 235.

As shown in FIG. 5, process 500 may include receiving data associated with network resources of a center (block 510). For example, analytics system 205 may receive the data associated with the network resources of the center. For example, analytics system 205 may receive the data from a storage location (e.g., memory resources of analytics system 205). In some implementations, analytics system 205 may receive the data in a similar manner as described above with respect to process block 410.

As further shown in FIG. 5, process 500 may include processing the data to permit an analytics system to determine a manner in which the network resources are to be consolidated (block 520). For example, analytics system 205 may process the data to align or correlate data from multiple sources. In some implementations, processing the data may permit analytics system 205 to determine a manner in which the network resources are to be consolidated.

In some implementations, when processing the data, analytics system 205 may perform a mismatch analysis. In some implementations, when performing the mismatch analysis, analytics system 205 may identify inconsistencies, misalignments, etc. among data from different sources (e.g., by comparing the data from the different sources and determining whether the comparison indicates a match). For example, analytics system 205 may identify inconsistencies in data received from sensor device 220 (e.g., data gathered about network resources physically located in a center) and data received from server device 230 (e.g., electronic records of network resources in the center).

In some implementations, and as an example, an inconsistency may include a scenario where data from sensor device 220 identifies different network resources at a particular center than data from server device 230. Additionally, or alternatively, and as another example, an inconsistency may include a scenario where data from different sources identifies a different PSTN service associated with a telephone number. Additionally, or alternatively, and as another example, an inconsistency may include a scenario where data from sensor device 220 indicates that a particular circuit is active but data from server device 230 indicates that the same circuit is inactive.

In some implementations, analytics system 205 may perform an action based on a result of the mismatch analysis (e.g., perform an action related to the data). For example, analytics system 205 may remove inconsistent data. As another example, analytics system 205 may default to using data gathered by sensor device 220 and/or user device 225 (e.g., data gathered for network resources physically located at the center), rather than using data from server device 230. As another example, analytics system 205 may transmit a message to a network administrator that indicates an inconsistency in the data and/or generate a work order for a network administrator to resolve the inconsistency.

In this way, analytics system 205 reduces or eliminates inconsistent data, thereby conserving memory resources of analytics system 205. In addition, this improves the data for use by analytics system 205, thereby conserving processing resources of analytics system 205 when analytics system 205 uses the data.

As further shown in FIG. 5, process 500 may include determining the manner in which the network resources are to be consolidated based on processing the data (block 530). For example, analytics system 205 may determine the manner in which the network resources are to be consolidated during a plain old telephone system (POTS) consolidation, an integrated services digital network (ISDN)/basic rate access (BRA) consolidation, or a data center consolidation.

In some implementations, analytics system 205 may determine the manner in which the network resources are to be consolidated based on an attribute of the network resources. For example, analytics system 205 may determine the manner in which the network resources are to be consolidated based on a physical dimension of the network resources, a topographical location of the network resources in the center, other network resources to which the network resources are connected, or the like.

In some implementations, using the received data, analytics system 205 may determine physical dimensions of a network resource in the center. For example, analytics system 205 may determine a length and/or a diameter of a cable in the center using the received data. As another example, analytics system 205 may determine a length, width, and/or height of a network device in the center. In some implementations, analytics system 205 may determine the physical dimensions of the network resource in terms of a standard unit (e.g., a centimeters, meters, rack units, etc.). In some implementations, analytics system 205 may determine the physical dimensions of multiple network resources in the center.

In some implementations, analytics system 205 may determine an order and/or a priority for consolidating the network resources. For example, analytics system 205 may determine an order and/or a priority for consolidating cables in the center. In some implementations, the ordering and/or priority may be based on the physical dimensions of the network resources in the center (e.g., using information identifying the physical dimensions of the network resources). For example, cables in the center may be ordered and/or prioritized by length and/or diameter of the cables (e.g., ordered and/or prioritized from largest physical dimensions to smallest physical dimensions, smallest physical dimensions to largest physical dimensions, based on satisfying a threshold physical dimension, etc.). Continuing with the previous example, cables in a center with the longest length and/or largest diameter dimensions, relative to other cables in the center, may be ordered for consolidation first and/or receive a high priority (e.g., to maximize physical space that is consolidated).

Additionally, or alternatively, the order and/or priority of the network resources may be based on information related to the network resources other than information identifying the physical dimensions of the network resources. For example, the order and/or priority of cables may be based on a quantity of busy circuits connected to each of the cables. Continuing with the previous example, cables with the highest quantity (or a threshold quantity) of busy circuits may be ordered and/or prioritized first to minimize a quantity of circuit re-positioning.

Additionally, or alternatively, analytics system 205 may determine an order and/or a priority for consolidating network resources based on a topographical or physical position of the network resources in the center. For example, analytics system 205 may determine a topographical and/or physical location of circuits (e.g., origin circuits, destination circuits, or POTS circuits) in a center using received data and may determine an order and/or a priority for consolidating the circuits and/or cables associated with the circuits, such as based on a proximity of the cables and/or the circuits to a particular rack or room in the center.

In some implementations, when determining the order and/or priority for consolidation based on topographical or physical position, analytics system 205 may order and/or prioritize the network resources to satisfy a threshold, satisfy a criteria, or the like. For example, analytics system 205 may order and/or prioritize consolidation of circuits or cables to minimize a distance that the circuits and/or cables are moved during consolidation, to satisfy a threshold distance moved, or the like. As another example, analytics system 205 may order and/or prioritize consolidation of circuits to maximize shutdown (e.g., decommissioning) of the circuits and/or other network resources, such as racks, or to shut down a threshold quantity or percentage of the circuits and/or other network resources.

In some implementations, analytics system 205 may determine an order and/or priority for consolidation of slots in a rack. For example, analytics system 205 may determine an order and/or priority for consolidation of slots in a rack based on a quantity of busy circuits associated with the slots (e.g., an order based on a descending quantity of busy circuits or an ascending quantity of busy circuits). In some implementations, analytics system 205 may determine the order and/or priority based on a position of slots in the rack. For example, analytics system 205 may determine an order and/or priority for repositioning (e.g., iteratively) busy circuits by starting with the last slot in a row of slots in a rack. As another example, analytics system 205 may determine an order and/or priority for repositioning of free circuits starting with the first slot in a row of slots in a rack.

In some implementations, analytics system 205 may select network resources to consolidate. For example, analytics system 205 may select cables in a center to consolidate (e.g., select origin and/or destination cables to consolidate). In some implementations, analytics system 205 may select network resources to consolidate based on information identifying the network resources as network resources to be consolidated, migrated, decommissioned, or removed. For example, analytics system 205 may select origin cables in a center, associated with a high-level consolidation, based on information identifying the origin cables as cables to be consolidated. Additionally, or alternatively, analytics system 205 may select network resources to consolidate based on an ordering and/or priority, such as an order and/or priority determined by analytics system 205 (e.g., as described above). For example, analytics system 205 may select cables to consolidate based on an order and/or priority of the cables related to physical dimensions of the cables by selecting cables that are ordered first, or have a high priority, relative to other cables.

In some implementations, analytics system 205 may not select network resources that are to be decommissioned for consolidation. In this case, analytics system 205 may decommission the network resources, such as by disconnecting the network resources from a network, rather than consolidating the network resources. This conserves processing resources of analytics system 205, by reducing or eliminating the use of processing resources to consolidate network resources that are to be decommissioned.

In some implementations, analytics system 205 may select network resources to consolidate until a threshold is satisfied, a criteria is satisfied, or the like. For example, analytics system 205 may select cables to consolidate until the combined physical dimensions of the selected cables equal a physical dimension (e.g., area, height, width, or length) of a multi-service access node (MSAN) to be installed during a migration effort. As another example, analytics system 205 may select network devices in a center until the combined physical dimensions of the selected network devices equal the physical dimensions of a rack in the center (e.g., the combined rack units of the selected network devices equal the rack units of the rack).

In some implementations, analytics system 205 may identify additional network resources to select. For example, analytics system 205 may identify additional cables to select when total physical dimensions of the selected cables, such as cables selected based on being identified as cables to be consolidated or based on an order and/or priority of the cables, do not equal the physical dimensions of the MSAN. Continuing with the previous example, analytics system 205 may select additional cables to consolidate until the total physical dimensions of the selected cables equal the physical dimensions of the MSAN. In some implementations, analytics system 205 may select the additional network resources based on a rule, based on a policy, based on user input, etc.

In some implementations, when determining the manner in which to consolidate the network resources, analytics system 205 may determine an action item. For example, analytics system 205 may determine an action item related to physically moving network resources in a center, such as an action item to move a network resource from a first rack to a second rack.

In some implementations, when determining the manner in which to consolidate the network resources, analytics system 205 may determine a network complexity of the center. For example, analytics system 205 may determine a quantity of network resources in the center, a type of the network resources in the center, connections among the network resources, or the like based on the data. This may enable analytics system 205 to determine a manner in which to consolidate the network resources that satisfies a high-level consolidation requirement (e.g., a requirement related to consolidation of centers), a low-level consolidation requirement (e.g., a requirement related to consolidation of network resources in a center), or the like.

In accordance with the above, analytics system 205 may determine a manner in which to consolidate network resources of a center, such as a data center, a wire center, a telephone exchange, or the like. In this way, analytics system 205 may quickly and efficiently determine a manner in which to consolidate network resources of a center, thereby conserving processing resources of analytics system 205.

As shown in FIG. 5, process 500 may include performing an action to consolidate the network resources based on determining the manner in which the network resources are to be consolidated (block 540). For example, analytics system 205 may perform an action, or cause another device to perform an action, to consolidate the network resources.

In some implementations, when performing the action, analytics system 205 may send a message or a command to another device. For example, analytics system 205 may send a message or a command to user device 225, such as a robot, to consolidate network resources in a center (e.g., to physically move circuits and/or cables from one rack in the center to another rack in the center). Continuing with the previous example, analytics system 205 may send a message or a command to user device 225 to iteratively, or repeatedly, move circuits connected to origin cables to free circuits connected to destination cables. In some implementations, analytics system 205 may generate and provide a set of instructions. For example, analytics system 205 may generate a set of instructions related to consolidating the network resources and provide the set of instructions to user device 225, such as a robot.

Additionally, or alternatively, when performing the action, analytics system 205 may generate a report. For example, analytics system 205 may generate a report that includes information about the manner in which to consolidate the network resources. In some implementations, the report may include information related to consolidation of the network resources. For example, the report may include information related to physical space available due to consolidation, network resources available for decommissioning and/or spare part recovery, energy savings that may occur due to decommissioning, etc.

Additionally, or alternatively, when performing the action, analytics system 205 may schedule a meeting. For example, analytics system 205 may schedule a meeting among managers of the center (e.g., by using electronic calendars of the managers to identify a time when a threshold quantity of managers are available).

Additionally, or alternatively, analytics system 205 may generate a work order and provide the work order. For example, analytics system 205 may generate a work order for a network administrator to consolidate the network resources, to shut down idle network resources or network resources to be decommissioned, or to collect spare parts. In some implementations, analytics system 205 may provide the work order to user device 225 and/or client device 235 (e.g., for display) and/or schedule the worker based on the work order. Similarly, and as another example, analytics system 205 may send a message or a command to user device 225 to cause user device 225 to shut down idle network resources or network resources to be decommissioned.

Additionally, or alternatively, when performing the action, analytics system 205 may send a message, such as an email or a short message service (SMS) message, to a worker in the center (e.g., via user device 225 or client device 235). In some implementations, analytics system 205 may use the message to notify the worker which network resources to consolidate and how to consolidate the network resources, such as by providing information identifying origin and destination racks for the network resources.

Additionally, or alternatively, analytics system 205 may update data. For example, analytics system 205 may provide updated data based on the consolidation to server device 230, a system, or a platform (e.g., to update an electronic record of a physical location of the network resources in the center).

In this way, analytics system 205 may quickly and efficiently consolidate network resources in a center, thereby conserving processing resources related to consolidating the network resources.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Implementations described herein enable an analytics system to automatically receive data associated with network resources in a center, determine a manner in which the network resources are to be consolidated (e.g., prior to being migrated and/or decommissioned), and consolidate the network resources. This enables the analytics system to quickly and efficiently determine a manner in which to consolidate the network resources, thereby conserving processing resources. In addition, migrating and/or decommissioning efforts may be streamlined and/or made more efficient, thereby conserving resources related to migrating and/or decommissioning efforts.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
   receive data associated with network resources,
   the data being received from another device and from a system,
   the data including first data that identifies one or more physical dimensions of the network resources;
   process the data to align the data received from the other device and from the system;
   determine a manner in which the network resources are to be consolidated based on the one or more physical dimensions of the network resources;
   determine an order in which to consolidate the network resources based on the one or more physical dimensions; and
   perform an action based on determining the manner in which the network resources are to be consolidated, the action being associated with consolidating the network resources.

2. The device of claim 1, where the data further includes second data that identifies a topographical position of the network resources in a center; and
   where the one or more processors, when determining the order in which to consolidate the network resources, are further to:
   determine the order in which to consolidate the network resources based on the topographical position.

3. The device of claim 1, where the one or more processors are further to:
   select the network resources to consolidate based on information indicating that the network resources are to be consolidated, or select the network resources to consolidate based on the order in which to consolidate the network resources.

4. The device of claim 1, where the one or more processors, when processing the data, are to:
process the data using a mismatch analysis; and
where the one or more processors are further to:
identify a mismatch between first data and second data, the first data and the second data being included in the data; and
use the first data or the second data to determine the manner in which the network resources are to be consolidated based on identifying the mismatch.

5. The device of claim 1, where the data further includes:
second data gathered from the network resources that are physically located in a center, or
third data from an electronic record associated with the network resources.

6. The device of claim 1, where the one or more processors, when performing the action, are to:
send a message or a command to another device to cause the other device to consolidate the network resources in a center.

7. The device of claim 1, where the one or more processors, when performing the action, are to:
provide instructions that cause a network resource of the network resources to be moved from a first rack to a second rack.

8. A computer-readable medium storing instructions, the instructions comprising:
one or more instructions that, when executed by one or more processors, cause the one or more processors to:
receive data associated with one or more network resources,
first data of the data being associated with the one or more network resources physically located in a center,
second data of the data being associated with an electronic record of the one or more network resources;
process the data based on receiving the data associated with the one or more network resources;
determine one or more action items associated with consolidating the one or more network resources in the center based on the first data or the second data;
identify a quantity of busy circuits connected to one or more cables in the center; and
determine an order of consolidating the one or more cables based on the quantity of busy circuits connected to the one or more cables; and
perform one or more actions based on determining the one or more action items.

9. The computer-readable medium of claim 8, where the one or more instructions, when executed by the one or more processors, further cause the one or more processors to:
send a message or a command to a robot or an unmanned aerial vehicle (UAV) to gather the first data; and
where the one or more instructions, that cause the one or more processors to receive the data, cause the one or more processors to:
receive the data from the robot or the UAV.

10. The computer-readable medium of claim 8, where the one or more instructions, when executed by the one or more processors, further cause the one or more processors to:
determine a length or a diameter of the one or more cables; and where the one or more instructions, that cause the one or more processors to determine the order, cause the one or more processors to:
determine the order further based on the length or the diameter of the one or more cables; and
where the one or more instructions, that cause the one or more processors to determine the one or more action items, cause the one or more processors to:
determine the one or more action items based on the order.

11. The computer-readable medium of claim 8, where the one or more instructions, when executed by the one or more processors, further cause the one or more processors to:
determine whether a physical dimension of the one or more cables matches a physical dimension of a multi-service access node (MSAN); and
select one or more additional cables of the one or more network resources based on determining that the physical dimension of the one or more cables does not match the physical dimension of the MSAN.

12. The computer-readable medium of claim 11, where the one or more instructions, when executed by the one or more processors, further cause the one or more processors to:
identify the one or more additional cables based on a rule; and
where the one or more instructions, that cause the one or more processors to select the one or more additional cables, cause the one or more processors to:
select the one or more additional cables based on identifying the one or more additional cables.

13. The computer-readable medium of claim 8, where the one or more instructions, that cause the one or more processors to perform the one or more actions, cause the one or more processors to:
generate a report associated with consolidating the one or more network resources;
generate a set of instructions associated with consolidating the one or more network resources; and
provide the set of instructions based on generating the set of instructions,
the set of instructions causing a device to consolidate the one or more network resources.

14. The computer-readable medium of claim 8, where the one or more instructions, that cause the one or more processors to perform the one or more actions, further cause the one or more processors to:
provide instructions that cause a network resource of the network resources to be moved from a first rack to a second rack.

15. A method, comprising:
receiving, by a first device, data associated with network resources that are to be consolidated, the data being received from a second device used to gather the data from a center, the data being received from a third device that stores an electronic record of the network resources;
processing, by the first device, the data based on receiving the data;
selecting, by the first device, the network resources for consolidation based on satisfying a threshold or a criteria;
determining, by the first device, a manner in which to consolidate the network resources in the center based on selecting the network resources and based on an attribute of the network resources,
the attribute being included in the data, the attribute defining a physical feature of the network resources, the manner in which to consolidate the network resources being associated with physically moving the network resources in the center; and performing, by the first device, an action associated with physically moving the network resources in the center based on determining the manner in which to consolidate the network resources.

16. The method of claim 15, further comprising:

determining an order in which to consolidate slots of a rack located in the center based on the attribute, the attribute being associated with the slots; and where determining the manner in which to consolidate the network resources comprises:

determining the manner in which to consolidate the slots of the rack based on the order.

17. The method of claim 15, further comprising:

determining whether the data received from the second device identifies the same network resources located in the center as the data received from the third device; and where processing the data comprises:

processing the data based on determining whether the data received from the second device identifies the same network resources located in the center as the data received from the third device.

18. The method of claim 15, further comprising:

determining an order in which to consolidate the network resources based on the attribute of the network resources, the order being associated with satisfying a second threshold or a second criteria during consolidation of the network resources; and where determining the manner in which to consolidate the network resources comprises:

determining the manner in which to consolidate the network resources based on the order.

19. The method of claim 15, where performing the action comprises:

moving a network resource of the network resources from a first rack located in the center to a second rack located in the center.

20. The method of claim 15, where the attribute of the network resources comprises one or more physical dimensions of the network resources.

* * * * *